Dec. 30, 1952

R. P. SCHERER 2,623,494

CAPSULE BANDING MACHINE

Filed March 25, 1950

INVENTOR.
Robert P. Scherer
BY Bair, Freeman
& Molinare attys.

Fig. 2

Dec. 30, 1952 R. P. SCHERER 2,623,494
CAPSULE BANDING MACHINE
Filed March 25, 1950 11 Sheets-Sheet 5

Fig. 5

INVENTOR.
Robert P. Scherer
BY Bair, Freeman
& Molinare
attys.

INVENTOR.
Robert P. Scherer
BY Bair, Freeman
& Molinare Attys.

Dec. 30, 1952        R. P. SCHERER        2,623,494

CAPSULE BANDING MACHINE

Filed March 25, 1950        11 Sheets-Sheet 10

INVENTOR.
Robert P. Scherer
BY Bair, Freeman
& Molinare Attys.

Dec. 30, 1952     R. P. SCHERER     2,623,494
CAPSULE BANDING MACHINE Filed March 25, 1950     11 Sheets-Sheet 11

INVENTOR.
Robert P. Scherer
BY Bair, Freeman
& Molinare attys.

Patented Dec. 30, 1952

2,623,494

UNITED STATES PATENT OFFICE 2,623,494

CAPSULE BANDING MACHINE

Robert Pauli Scherer, Detroit, Mich., assignor to R. P. Scherer Corporation, Detroit, Mich., a corporation of Michigan Application March 25, 1950, Serial No. 151,904

6 Claims. (Cl. 118—6)

1

This invention relates to an automatic machine for applying a peripheral band of color to a capsule or the like.

The machine of this invention is particularly adapted for the application of aqueous coloring media to gelatin capsules in the form of narrow bands on areas that, on drying, form colored stripes sharply contrasting with the remainder of the capsules. In this manner a distinctive appearance is conferred on the capsules. The location, width, number and color of the stripes can be varied as desired, so that any one type of capsule can be rendered readily distinguishable from other types, as according to the amount or nature of the capsule contents. Further, the distinctive colored bands or stripes can be used to characterize the capsules as the product of a certain manufacturer, in other words, as a mark of origin.

It is therefore an important object of the present invention to provide a machine for the purpose indicated capable of receiving a mass of capsules and of automatically withdrawing them from the mass and orienting them for a step by step advancing means which moves them to a station from which they are picked up for applying to each capsule one or more peripheral bands of color, no manual handling of the capsules being required.

A preferred embodiment of the invention is shown in the accompanying drawings, in which.

2

Figure 1:
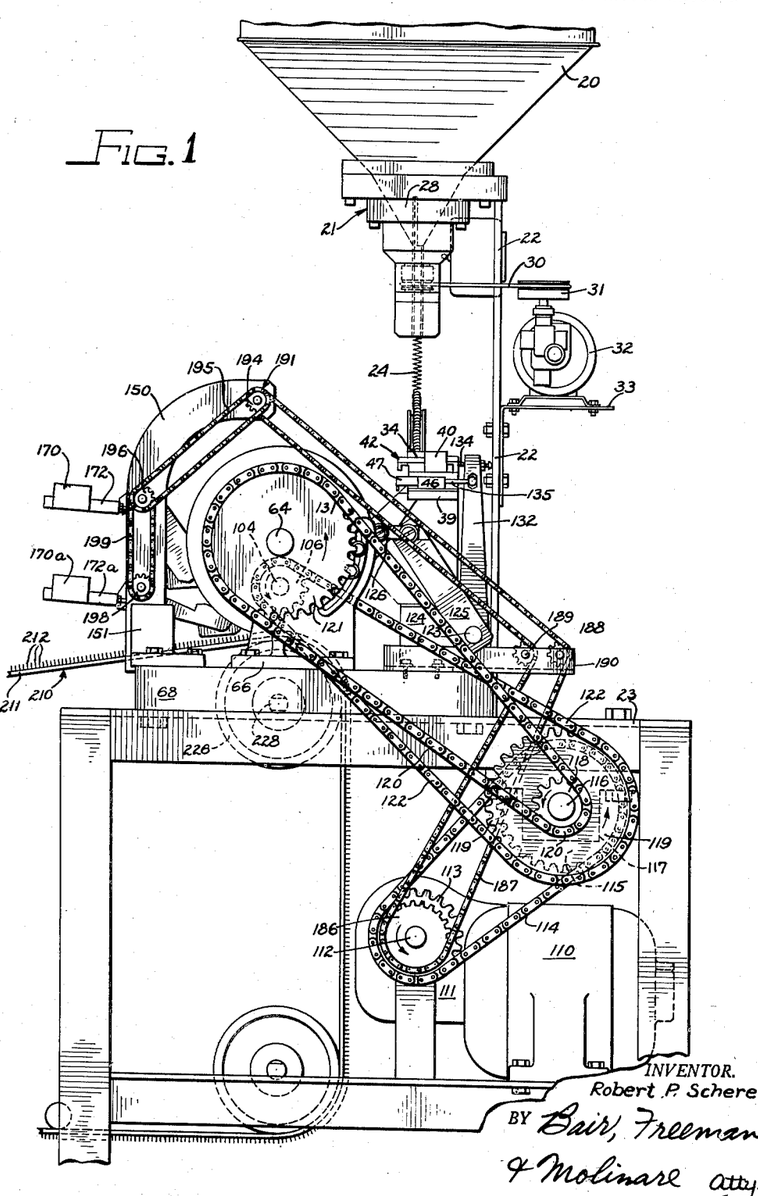
Figure 1 is a side elevational view of a machine according to this invention, parts being broken away, in particular, a portion of a drying belt and drive therefor.
Figure 6:
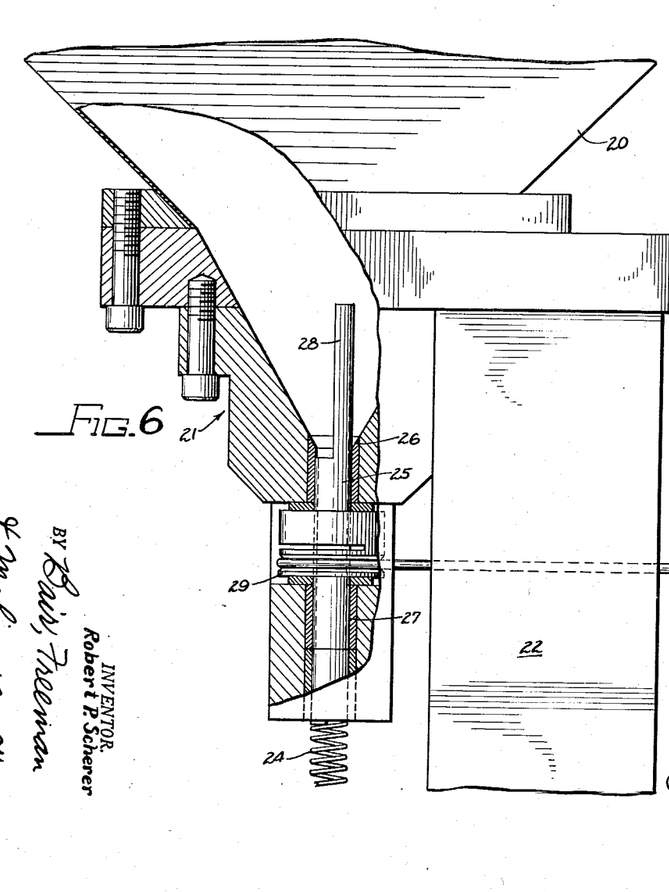
Figure 6 is an enlarged side elevational view, with parts broken away, of a hopper and feed tube forming part of the apparatus of Figure 1.

Referring to Figure 1, the apparatus there shown includes an upper hopper 20 of inverted frusto-conical form into which the capsules to be banded are fed. Due to previous manufacturing steps, the capsules are in a mass wherein they are oriented at random. The hopper is capable of receiving such mass, and mechanism to be described withdraws the capsules and orients them for a step by step mechanism also to be described. As shown in Figure 6, the hopper 20 is supported around its base by a horizontally extending member generally indicated at 21. Support for the member 21 is provided by a stand 22 extending vertically from a table or bed 23. The member 21 is hollow, defining an inverted frusto-conical discharge passage for the hopper and also a straight tubular passage. Into the end of the latter there is fitted the end of a flexible conduit or feed tube 24 preferably having the form of an elongated coil with sufficient spacing between the coil turns to permit visual inspection of the interior of the tube 24. A short tube 25 connects the frusto-conical passage of the member 21 with the end of the flexible tube 24. The tube 25 is rotatably mounted in spaced sleeve bearings 26 and 27 accommodated in the member 21 and has an upper portion 28 projecting into the frusto-conical passage in the member 21. This upper tube portion 28 is mutilated, consisting only of one longitudinal tube half. The tube 25 has a pulley 29 mounted thereon between the bearings 26 and 27 which is driven by a cable 30 passing over a pulley 31 mounted on a gear reducing motor 32 disposed on a bracket 33 affixed to the stand 22.

On rotation of the tube 25, the upper mutilated portion 28 thereof acts as a scoop orienting capsules from the frusto-conical aperture in the member 21 and feeding them into the tube 25. The capsules then pass in longitudinal or end-to-end alignment through the tube 25 into and through the flexible tube 24.

Immediately past the tube 24, the mechanism includes two spaced aligned passages for axially aligned capsules. The last passage discharges onto a discharge station. Two gate members are reciprocable, respectively, in the interspace between said two passages and over said discharge station, to control the gravitational movement out of said first passage and into said second passage and out of said second passage into said discharge station. The second gate member also is operative for discharging capsules from said station. This part of the mechanism is described in greater detail as follows.

As shown in Figures 1, 7, and 15–19, the lower end of the flexible feed tube 24 projects through a longitudinal bore 35 formed in the upper portion 34 of an inclined block member and for a short distance into a transverse aperture 36 likewise formed in the upper portion 34 of the inclined member. Below this aperture, another longitudinal bore 37 in the upper portion 34 of the block member is aligned with the bore 35 and registers with a bore 38 formed in the lower portion 39 of the block member, which lower portion acts as a stop-position member. The latter is integral with the upper portion 34 of the block member, but the upper portion 34 and the lower portion 39 will be hereinafter referred to as block member 34, and stop-position member 39 or block member 39. A plate 40 is mounted on the upper face of the block member by means of screws 41. The purpose of plate 40 is to cooperate with a slot-like recess in the upper portion 34 to form a passageway which restrains middle portion 42a of the gate member 42 in a manner as will be evident as this description proceeds, and as can be seen in the drawings.

Figure 2:
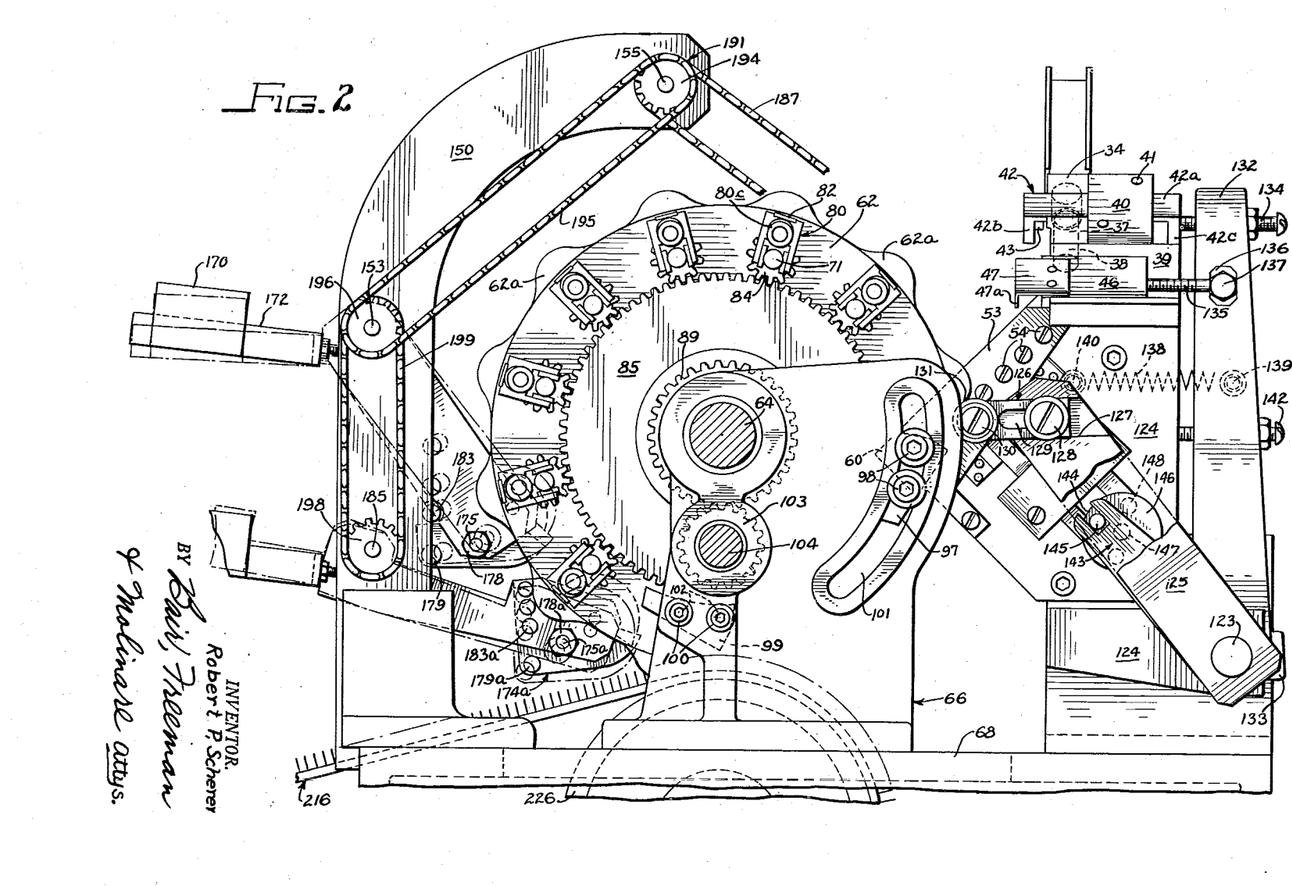
Figure 2 is an enlarged cross sectional view taken along the line 2—2 of Figure 4, with parts broken away.
Figure 3:
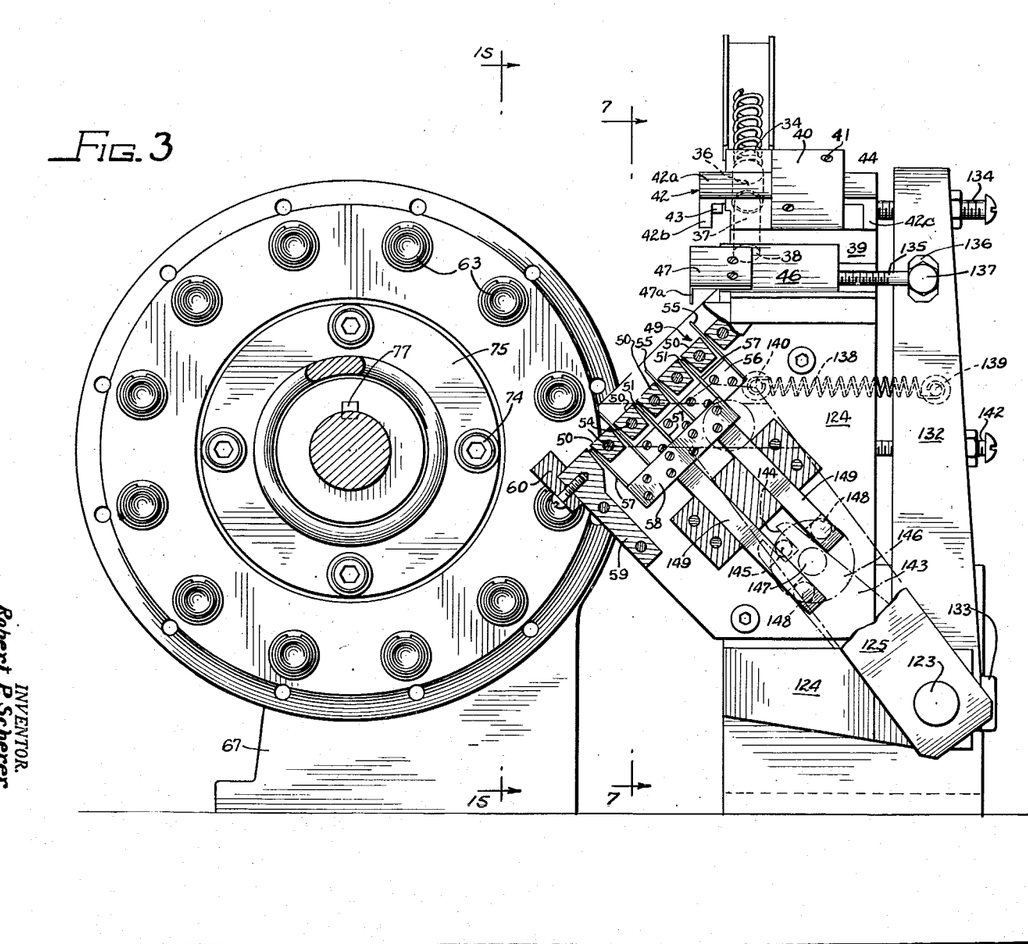
Figure 3 is an enlarged cross sectional view taken along the line 3—3 of Figure 4, with parts broken away.
Figures 17, 20:
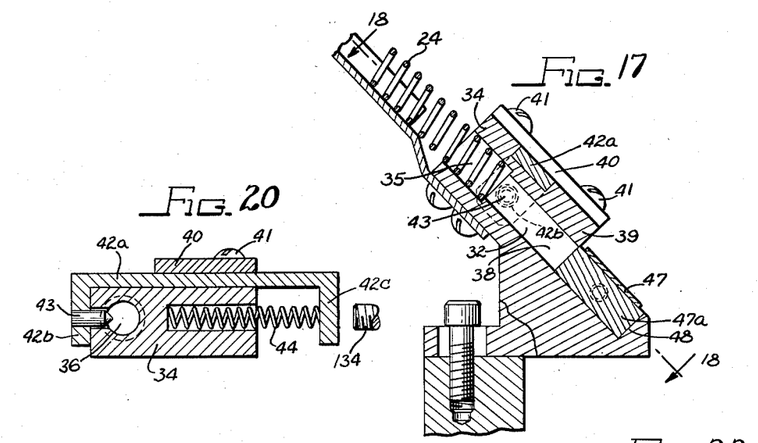
Figure 17 is an enlarged cross sectional view taken along the line 17—17 of Figure 16.
Figure 20 is an enlarged cross sectional view taken along the line 20—20 of Figure 19.
Figure 18:
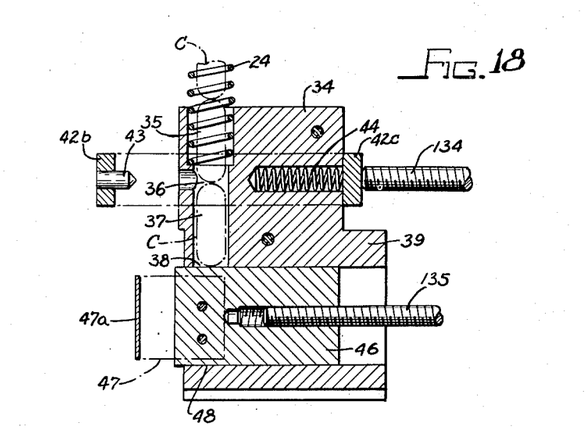
Figure 18 is an enlarged cross sectional view taken along the line 18—18 of Figure 17 showing the working parts in one operating position.

A gate member generally indicated at 42 is slidably mounted in the aperture 36. As shown in Figures 2, 3, and 20 the gate member 42 is generally A-shaped having an elongated middle portion 42a extending in parallelism with and under the plate 40, a left depending end flange 42b and a right depending end flange 42c. A tapered pin 43 extends from the end flange 42b toward the end flange 42c for only a sufficient distance to prevent passage of capsules from the bore 35 across the aperture 36 into the bore 37 when the gate member is retracted to the right (as shown in Figures 2, 3 and 20), but not when the gate member 42 is moved over to the left (as shown in Figure 18). A spring 44 mounted on the block member 34 presses against the end flange 42c to bias the gate member 42 into the position shown in Figures 19 and 20 where the pin 43 prevents passage of a capsule across the aperture 36.

The lower part of the stop-position member 39 is formed with a transverse aperture 45 open to the left into which the bore 38 discharges. A gate plunger member 46 of block form is slidably mounted in the aperture 45. This gate plunger has attached to its left front edge a plate 47 bent near its terminal edge to form a depending terminal flange 47a. The space between the flange 47a and the end of the plunger 46 is sufficiently wide and sufficiently long to receive a capsule extending with its axis in parallelism with the flange 47a. The plunger 46, when in the position shown in Figures 2, 3, and 18, closes the discharge aperture of the bore 38. When the plunger is retracted to the right, a capsule within the bore 38 is free to slide into the floor of the aperture 45, between the flange 47a and the end of the plunger 47, the leading end of the capsule then coming to rest against the lower side wall of the aperture 45 which is indicated at 48.

Figure 19:
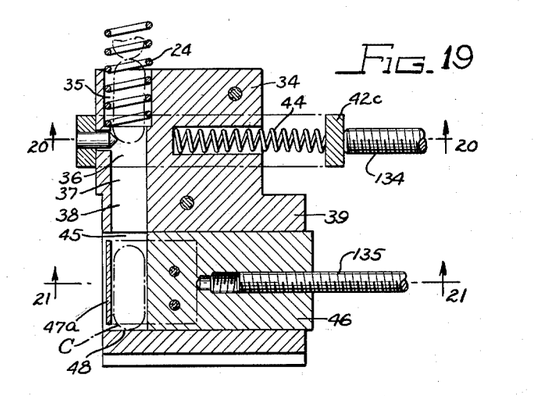
Figure 19 is a view similar to Figure 18 but showing the working parts in another operating position.
Figure 21:
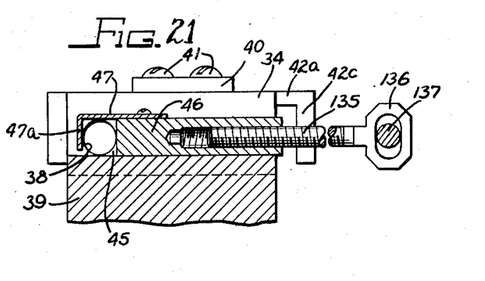
Figure 21 is an enlarged cross sectional view taken along the line 21—21 of Figure 19.

In the operation of the parts of the apparatus described hereinabove, the conduit 24 is filled with axially aligned capsules fed into the conduit by the scoop action of the upper mutilated portion 28 of the short tube 25 as the latter is rotated. The leading end of the lowermost of these capsules rests against the pin 43 mounted on the gate member 42. The latter is continuously reciprocated (by means described hereinbelow) at a rate such as to permit discharge of a single capsule from the projecting end of the conduit 24 and passage of this capsule across the aperture 36 into the lower bore 37 while the gate member is reciprocated to the left as shown in Figure 18. However, the rate of movement of capsules through the conduit is sufficiently slow to permit return of the gate member to closing or blocking position before a second capsule has had time to emerge from the end of the conduit 24. The capsule thus passing across the aperture 36 enters the bore 38. Continuous further movement of the capsule out of the bore 37 is arrested by the upper surface of the plunger 46 which is reciprocated synchronously with the gate member 42 (by means described hereinbelow). When both the gate member 42 and the plunger 46 are retracted to the right (as shown in Figure 19), the capsule within the bore 38 slides downwardly into the aperture 45 (between the plunger 47a and the end of the plunger) and comes to rest against the wall 48 while another capsule moves out of the conduit into the bore 38 in the manner described hereinabove. As next the plunger 46 is reciprocated to the left, further continuous movement of the capsule which has just moved into the bore 38 is arrested, and the capsule resting on the floor of the aperture 45 is displaced to the left over this flow to a point beyond the left edge of the stop member 39 where the capsule falls vertically onto a step by step advancing device described hereinbelow. It will be noted that each capsule is caused to fall from the edge of the floor of the aperture 45 at intervals predetermined by the rate of reciprocation of the plunger 46 and that, since the trailing end of each capsule is elevated only to a limited extent above the leading end of the capsule, the capsule can fall on its side into a more or less horizontal surface. In brief, the longitudinal gravitational movement of a body of capsule through the conduit 24 is thus changed, by the means described, into gravitational movement in a direction transversely of each capsule, and timing of the movement of each individual capsule in this transverse direction is also effected.

Figure 7:
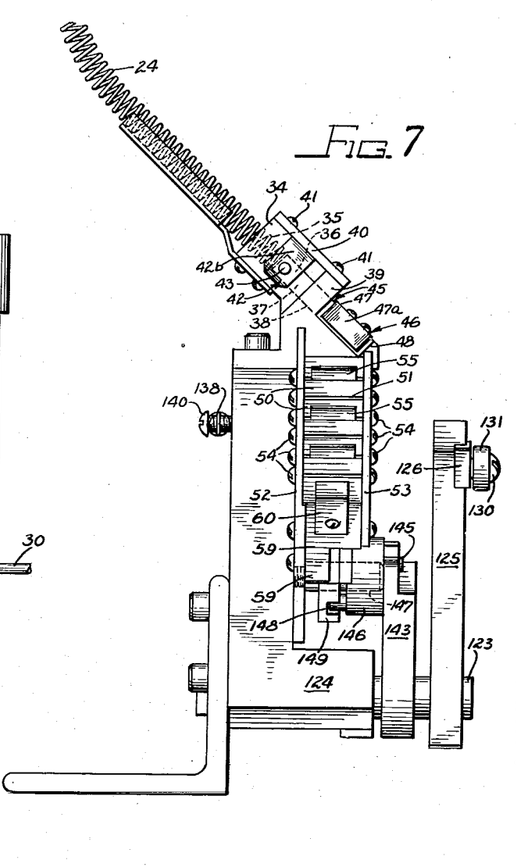
Figure 7 is an enlarged side elevational view taken along the line 7—7 of Figure 3.

The step by step mechanism herein before referred to comprises an inclined elongated member generally indicated at 49, which is arranged to receive the capsules caused to fall from the stop member 39 (see Figures 3 and 7). More particularly, the member 49 is positioned so as to receive each dropping capsule near the upper end of its upper longitudinal surface with the capsule extending transversely of this surface. Structurally, the member 49 is made up of blocks 50 spaced apart to define narrow transverse slots 51. The blocks 50 are held in position by lateral plates 52 and 53 and screws 54. A plurality of parallel tongues 55 extend in alternate slots 51 including the uppermost of these slots. These tongues are attached to a cross bar 56 adapted to be reciprocated transversely to cause the tongues 55 alternately to be projected out of the slots 51 and to be withdrawn into the slots 51. A second set of tongues 57 extend in the other slots 51 and are attached to a second cross bar 58. Means for reciprocating the cross bars 56 and 58 are described hereinbelow. The lower terminal portion of the inclined member 49 is formed by a block 59 attached to the side plates 52 and 53 like the blocks 50 and spaced from the lowermost block 50 to define a slot through which the lowermost tongue 57 is reciprocated. The upper surface of the block 59 is aligned with the upper surfaces of the block 50. An end stop 60 is mounted on the block 59.

The function of the member 49 is explained as follows. The operation of this member is synchronized with the parts described hereinabove so that a capsule is dropped onto the uppermost block 50 when the tongues 55 are projected out of the slots 51 and the tongues 57 are retracted into the slots. The capsule thus comes to rest against the uppermost tongue 55 transversely of the member 49. As the tongues 55 and 57 are alternately retracted and projected into and out of the slots 51, the capsule rolls successively over the upper surfaces of the blocks 50, being brought to rest momentarily against each of the tongues 55 and 57 until finally resting against the stop member 60. It should be understood that a plurality of capsules are fed one by one onto the member 49 in timed relationship with the movement of the tongues 55 and 57 so that at any one moment one capsule rests against either each one of the tongues 57, or against the tongues 55 and the stop member 60. As one more capsule is fed into the member, the capsules already in the member and resting against the tongues 57 or 60 advance under the influence of gravity by one step (over one of the blocks 50) until the lowermost capsule rests against the stop member 60. The step by step advancing means just described insures proper separation of the capsules, some of which might tend to stick to each other if not advanced in this manner to the station 60, so that only one at a time arrives at the station where it is grasped and removed from the member 49 by means described herein below. This also insures that each capsule is banded.

Figure 4:
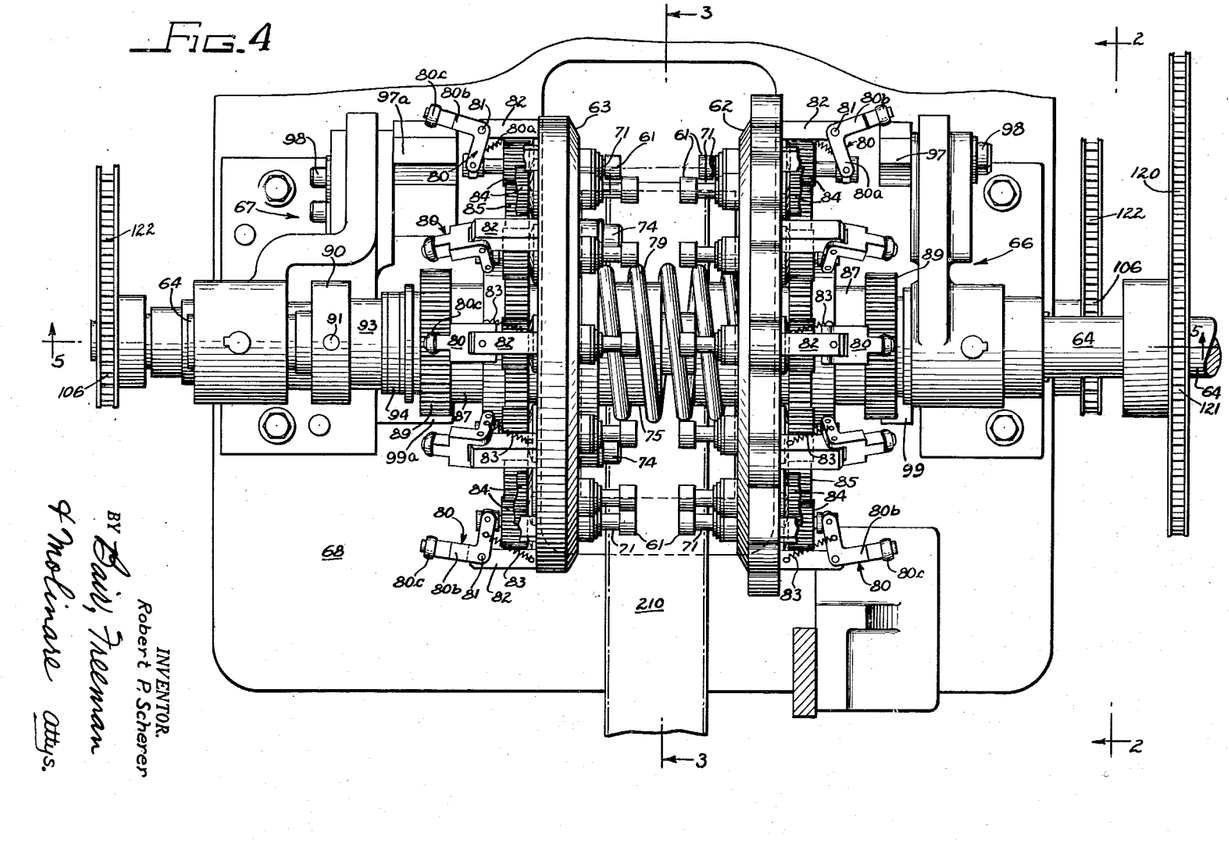
Figure 4 is an enlarged fragmentary plan view of the apparatus of Figure 1.
Figure 5:
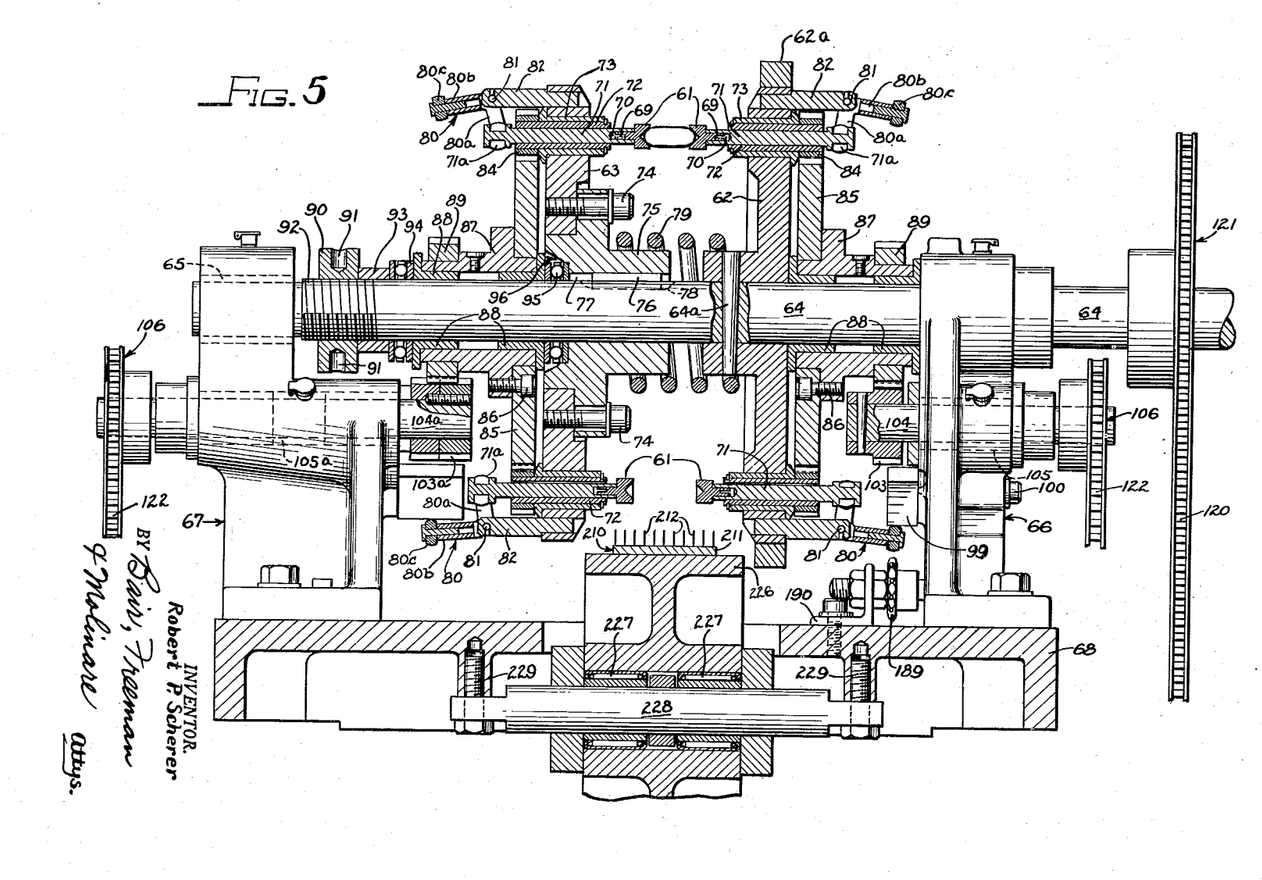
Figure 5 is an enlarged cross sectional view taken along the line 5—5 of Figure 4, with parts shown in elevation.

The means for grasping the capsules resting against the stop member 60 and for removing the capsules therefrom also are used to carry the capsules past inking devices to a location where these means release or drop the capsules onto a belt or other device where the ink deposited on the capsule is allowed or caused to dry. These grasping means include, as shown in Figures 4 and 5, a plurality of pairs of opposed chucks 61 carried by two spaced chuck wheels 62 and 63 mounted on a shaft 64 rotatable in bearings 65 formed in standards, generally indicated at 66 and 67, rising from a bed 68 supported by the table 23. More particularly, the chucks 61 are distributed over the inner margins of the chuck wheels 62 and 63, being formed with spring arms 69 entering terminal bores 70 in chuck arms 71. The latter are each fixed in collars 72 slidably. The collars 72 together with the chuck arms 71 are rotatably mounted in sleeve bearings 73 fixed in transverse apertures formed in the chuck wheels 62 and 63.

The chuck wheel 62 is fixedly mounted directly on the shaft 64, as by means of a pin 64a. The chuck wheel 63 is fixedly mounted, as by bolts 74, on a collar 75 slidable longitudinally over the shaft 64 but rotatable therewith, being held on the shaft by a key 76 fitting in keyways 77 and 78 formed, respectively, in the collar 75 and the shaft 64. A spring 79 concentric with the shaft 64 biases the chuck wheels 62 and 63 apart.

For reciprocating the chuck arms 71 in the collars 72, a bell crank 80 is provided for each chuck arm. The cranks 80 are pivoted, as by means of pins 81, from members 82 projecting outside the chuck wheels 62 and 63. Each crank 80 has one arm 80a terminally pivoted to a ring 71a disposed over the outside end of each chuck arm 71. The ring 71a is held against axial displacement along the chuck arm 71, but permits free rotation of the latter. Each crank 80 has also a second arm 80b terminating in a collar 80c adapted to roll over cam surfaces (described hereinbelow) for raising the crank arms 80b and thereby pull apart pairs of opposed chucks 61. Note that springs 83 are provided for biasing pairs of opposed chucks 61 toward each other.

For rotating the chuck arms 71 and collars 72 in the bearings 73, each collar 72 carries affixed thereto, outside the chuck wheels 62 and 63, a gear 84, meshing with one or the other of two gear wheels 85 fixedly mounted, as by screws 86, on one or the other of two collars 87 each rotatably mounted on the shaft 64 outside the chuck wheels 62 and 63 by means of pairs of spaced bushings 88. The collars 87 each carry drive gears 89 affixed to the outer ends of the collars. The actuating means for these drive gears will be described hereinbelow.

Means for adjusting the distance of the chuck wheel 63 from the chuck wheel 62 are provided in the form of an adjustment nut 90 having wrench sockets 91 and movable in threads 92 formed in the shaft 64 in the shaft area adjacent the standard 67. The nut 90 bears against a collar 93 fitting over the shaft 64 and abutting against a thrust bearing 94 fitted over the shaft 64 immediately outside the left bushing 88. The thrust of the nut 90 is transmitted to the collar 75 carrying the chuck wheel 63 through the collar 93, the thrust bearing 94, the outer left bushing 88, the left collar 87, the inner left bushing 88 and a thrust bearing 95 fitted over the shaft 64 in a recess 96 formed in the collar 75. The latter, as mentioned hereinabove, is slidable lengthwise of the shaft 64, being connected to the shaft 64 by means of the key 76.

Means for actuating the bell cranks 80 are provided in the form of upper cams 97 and 97a fixed, respectively, in the standards 66 and 67 by bolts 98 and lower cams 99 and 99a fixed, respectively, on the standards 66 and 67 by bolts 100. The cams 97 and 97a are so disposed as to spread apart pairs of opposed chucks 61 immediately before the chucks, on rotation of the chuck wheels 62 and 63 are aligned with a capsule resting against the stop 60 of the member 49. The cams 97 and 97a extend only a short distance so that when the spread apart chucks 61 come into alignment with said capsule resting against the stop 60, the cams release the chucks 61 which then, under the urging of the springs 83, approach each other and grasp and carry away the capsule, the ends of which fit into the recessed opposed chuck ends. For such adjustment of the position of the cams 97 and 97a, the cams are held on the standards 66 and 67 by bolts 98 piercing arcuate slots 101 in the standards and screwed into the cams (as shown in Figure 2). Note that the capsule is resiliently grasped, for the chucks are cushioned by the spring arms 69 and the springs 83. The lower cams 99 and 99a are disposed so as to spread the pairs opposed chucks apart and to release the grasped capsule after the capsule has been carried past inking devices described hereinbelow to a location above a drying device onto which the released capsules fall under the influence of gravity. The cams 99 and 99a are held in position by bolts 100 passing through holes 102 in the standards 66 and 67 and screwed into the cams 99 and 99a. Since these cams need not be as accurately positioned as the cams 97 and 97a, the holes 102 need not be arcuate.

The chucks 61 are caused to rotate counter to the chuck wheels 62 and 63 by means including the gears 84, the gears 85, the collars 87, the gears 89 and a pair of gears 103 and 103a mounted on shafts 104 and 104a journalled in bearings 105 and 105a in standards 66 and 67. The shafts 104 and 104a also carry sprockets 106.

In view of the axial adjustability of the chuck wheel 63 on the shaft 64, the shaft 104a, the gear 103a, the bearing 105a, the cam 97a and the cam 99a are made sufficiently long to maintain the indicated operative connections regardless of the axial position of the chuck wheel 63.

All the capsule feeding and carrying means are driven in properly timed relationship from a single source of power as shown in Figure 1. For instance, a motor 110 having attached thereto a gear reducer 111 with a drive shaft 112 provided with a sprocket 113. A chain 114 trained over the sprocket 113 engages a sprocket 115 fixed on a shaft 116, journalled in brackets 117 mounted on the underside of the table 23. Shaft 116 also carries a relatively small sprocket 118 and a pair of relatively large sprockets 119. Sprocket 118 drives a chain 120 engaging a sprocket 121 fixed upon the shaft 64, for driving the latter. Sprockets 119 drive belts 122 engaging sprockets 106 fixed upon the shafts 104 and 104a, for driving the latter. Thus, the shafts 64, 104 and 104a are each positively driven, and their movements are transmitted to the chuck wheels 62 and 63 and to the chucks 61 carried thereby so that the chucks 61 are carried along a circular path, are rotated on their axes while so carried and are also reciprocated through two cycles at different arcs of said orbit, as described hereinabove. The exact relative rates of orbital movement and axial rotation of the chucks is not critical, as will be understood from the description of the inking devices given hereinbelow, but can be regulated by use of sprockets and gears of suitable dimensions. It is important that the opposed chucks 86 rotate axially at the same rate. This result is obtained by having both gear shafts 104 and 104a driven at the same rate. The cam means whereby exact control of chuck reciprocation is brought about have been described hereinabove.

The above described capsule feeding mechanism must be exactly synchronized with the rotation of the chuck wheels 62 and 63 and the reciprocation of the chucks 61. For this purpose, means are provided (as shown in Figures 2 and 3) including a rockshaft 123 journalled in a support 124 rising from the bed 68 and a rocking arm 125 affixed to the shaft 123. A transverse extension arm 126 is adjustably mounted in a slot 127 formed in the free end of the actuating arm 125 by means of a bolt 128 passing through a longitudinal slot 129 in the arm 126. The free end of the arm 126 carries an offset member 130 provided with a cam follower 131. The latter is positioned to ride constantly over a cam ridge 62a in the cylindrical face of the chuck wheel 62, as shown in Figures 2 and 4. The cam ridge 62a is formed with one projecting lobe for each pair of opposed chucks 61. Thus, as the wheel 63 rotates, the rock shaft 123 is rocked once as each chuck moves past the offset member 130, the latter being lifted by the lobes of the cam ridge 62a and the motion of the offset member 130 being transmitted by the extension arm 126 and the rocking arm 125 to the rock shaft 123.

Means are disclosed hereinbelow whereby the rocking motion of the shaft 123 actuates the step by step feeding mechanism of this apparatus. It will be recalled that the moving parts of the feeding mechanism include the gate members 42 and 46. For actuating these two members, an arm 132 is rigidly attached by a set screw 133 to the rock shaft 123, extending generally vertically therefrom. Adjustable operative connections between the shaft 123 and the gate members 42 and 46 is provided, respectively, by screws 134 and 135 each mounted on the arm 132 and adjustably screwed into the gate members. The screw 135 may have a slot head 136 attached to a bolt 137 mounted in the arm 132. The arm 132 is biased by a spring 138 into a position in which the gate 42 is open and the gate 46 is closed. The spring 138 may have one end fastened to a pin 139 on the arm 132 and the other end fastened to a bolt 140 mounted in the support 124. The movement of the arm 132 under the influence of the spring 138 is adjustably limited by a screw 142 mounted on the arm 132 and butting against the support 124 when in the stop position.

The step by step feeding mechanism also includes cross bars 58 and 56. For operatively connecting these cross bars with the rock shaft 123, a toggle arm 143 has one end fixed on the rock shaft 123, the other end being slotted, as at 144, to cooperate with a pin 145 on one face of a toggle wheel 146 rotatably mounted on a shaft 147, which shaft is affixed to one of the side plates 52 of the inclined step by step feed member 49. Two spaced projections or pins 148 are provided on the other face of the wheel 146 for cooperation with the slotted ends of driving arms 149 each mounted on one of the cross bars 57 and 58.

Figure 15:
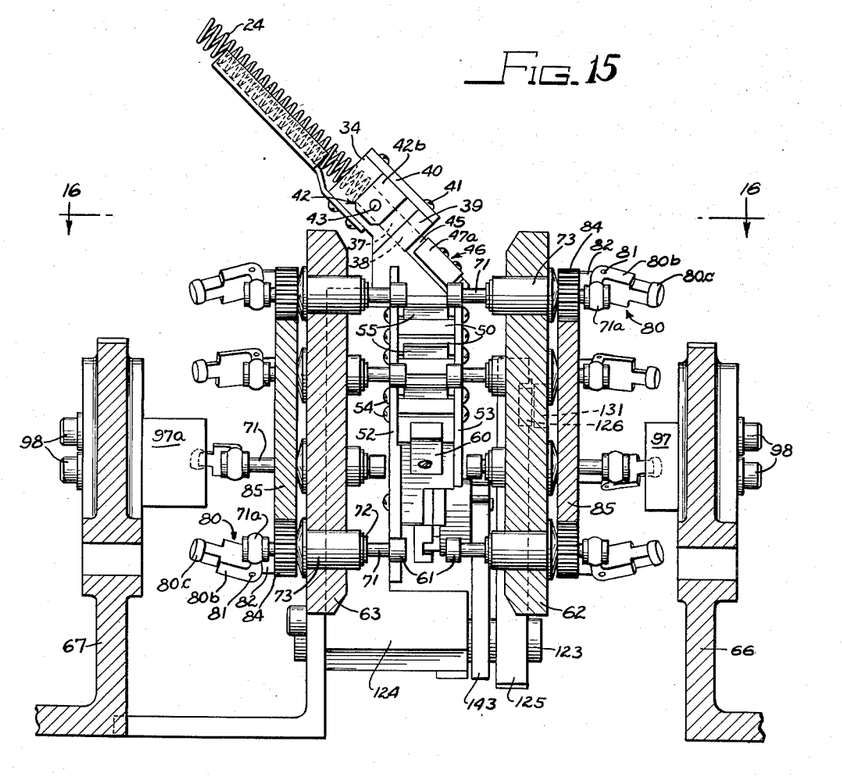
Figure 15 is an enlarged cross sectional view taken along the line 15—15 of Figure 3.
Figure 16:
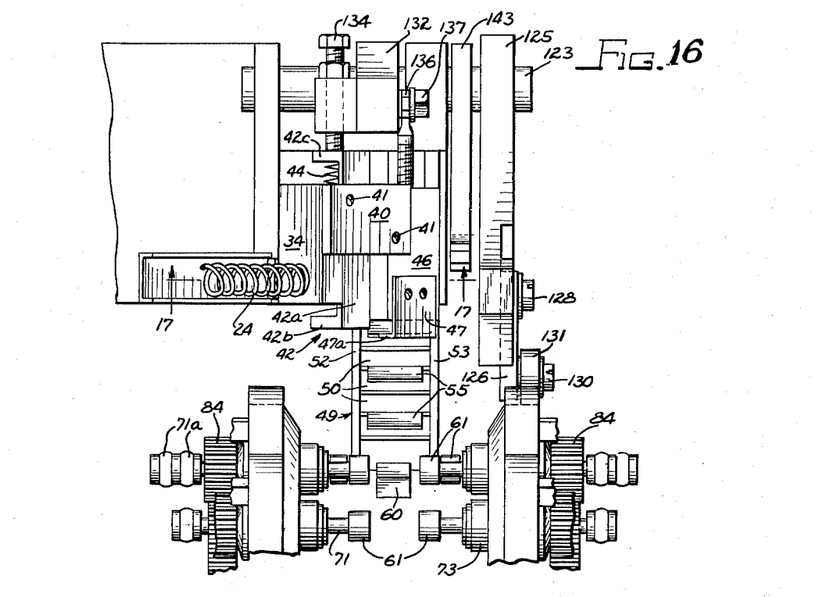
Figure 16 is an enlarged fragmenary plan view taken along the line 16—16 of Figure 15.

The feeding and movement of the capsules issuing in axial alignment from the tube 24 is brought about in a synchronized manner by the above described actuating means as follows. The path of the capsules through the feeding mechanism includes, in sequence, the bore 35 receiving capsules from the tube 24, the transverse aperture 36 in which the gate member 42 is reciprocated, the bore 37, the bore 38, and the transverse aperture 45 in which the gate member 46 is reciprocated. The two gate members 42 and 46 are both reciprocated simultaneously by the arm 132. But the gate member 42 opens the transverse aperture to passage of a capsule therethrough when the gate member is at the extreme left end of its stroke, while the gate member 46 then closes the transverse aperture 45 to such passage. Thus, at any one moment, the rocking of the shaft 123 causes one of the transverse apertures 36 and 45 to be closed and the other to be open. Further, the closing of the aperture 45 by the gate member simultaneously causes displacement of a capsule already in the aperture 45 therefrom, the displaced capsule falling onto the inclined member 49. When the gate member 46 is in closed and simultaneously in capsule discharging position, as shown in Figures 3 and 18, then the upper set of tongues 55 of the inclined member 49 project through alternate slots 51, while the lower set of tongues 57 are retracted within their respective slots 51. Thus, the capsule discharged by the gate member 46 onto the inclined member 49 comes to rest against the uppermost tongue 55. Further, retraction of the upper set of tongues 55 with simultaneous projection of the lower set of tongues 57 brings about step by step advancement of the capsule over the inclined member 49. The reciprocation not only of the gates 42 and 46 but also of the tongues 55 and 57 is brought about by the rocking of the shaft 123. The arm 143 is moved simultaneously with the arm 132, and so as to project the upper sets of tongues 55 (through the action of the wheel 146 with its upper pin 148—as seen in Figure 3—the arm 149 and the cross bar 56) whenever the gate member 46 is actuated to the left for discharging a capsule into the inclined member 49. Similarly, whenever the gate member 46 is actuated to the right for admitting a capsule from the bore 38 into the transverse space 45, then the set of tongues 55 is retracted and the lower set of tongues 57 projected, so as to vacate the top space on the inclined member 49 for receiving another capsule. Thus, all the feeding means are synchronously actuated from the rock shaft 123 and this shaft 123 is directly actuated by the rotation of the chuck wheel 62 carrying the cam ridge 62a, by means of the arm 125, its extension arm 126 and the terminal offset member 130 thereon provided with the cam follower 131 (riding on the cam ridge 62a). The lower end of the inclined member 49 and, in particular, the upper surface of the block 60, is disposed between and in the orbital path of the pairs of opposed chucks 61, as shown in Figures 15 and 16. The cam ridge 62a is formed with lobes equal in number to the pairs of opposed chucks, so that each time the shaft 123 is rocked, another pair of chucks 61 is brought into axial alignment with another capsule brought to rest in the block 60. The pair of chucks 61 thus brought into alignment has immediately previously been spread apart by the cams 97 and 97a and under the influence of the springs 83 then approach each other to grasp the capsule resting on the block 60 and to carry the grasped capsule along an orbital path until spread apart by the action of the cams 99 and 99a whereby the hold of the chucks on the capsule is released and the capsule is dropped.

As pointed out hereinabove, the capsules are rotated while carried by the chucks 61 along an orbital path. During this time one or more bands of ink are applied circumferentially to the capsule. The ink applying means are described as follows.

The inking means are best shown in Figures 1, 2, 8 and 9 and include rotatable upper and lower inking discs 169 and 169a disposed in the orbital path of the capsules held by the chucks 61, for resiliently forceful rolling edge contacts with the peripheries of the moving capsules over an arc forming a part of said orbital path. During such contact, ink is transferred from the generally frusto-conical edges of the inking discs to the capsules. Since the latter are rotated while carried along said orbital path, the ink is deposited on the capsules in the form of circumferential bands.

Figure 8:
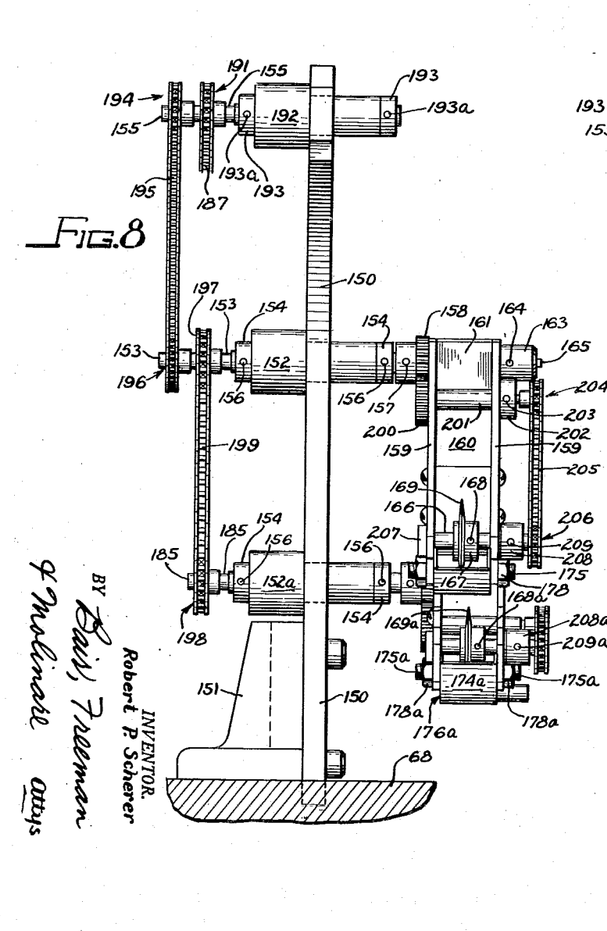
Figure 8 is an enlarged end elevational view of an inking mechanism forming part of the apparatus of Figure 1.
Figure 9:
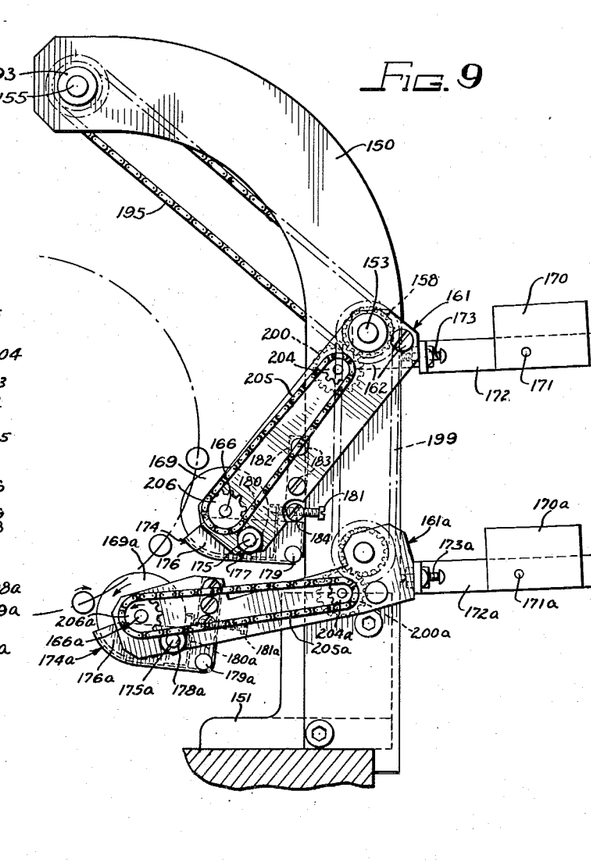
Figure 9 is an enlarged side elevational view of the inking mechanism of Figure 8.

The mechanism for resiliently supporting the disc 169 in the indicated position is described as follows. A curved erect structural member 150 is bolted to a stand 151 mounted on the bed 68. A sleeve 152 extends through the member 150 and journals a shaft 153. A pair of collars 154 are affixed to the shaft 153 outside the sleeve 152, as by set screws 156, to prevent axial displacement of the shaft 153. The shaft 153 projects outside of the collars 154, and the right hand end portion of the shaft has affixed thereon, as by a set screw 157, a gear wheel 158 which forms part of the inking disc actuating mechanism described hereinbelow. Next, the shaft 158 passes through aligned apertures formed in the upper part of the walls 159 of a channel shaped member 160. Between the walls 159, a member 161 is rotatably mounted on the shaft 153, being affixed to the walls 159 of the channel 160 by screws 162. Thus, the channel 160 and the member 161 form a unit pivotable on the shaft 153. Axial displacement of this unit along the shaft 153 is prevented by an end cap 163 held in place by set screws 164 and 165. At the lower end of the channel 160, a shaft 166 is journalled in the channel walls 159. Between these walls 159, a collar 167 is affixed to the shaft 166 by means of a set screw 168. The collar 167 carries the inking disc 169 as an integral part thereof. The lower end of the channel 160 carrying the inking disc 169 is resiliently biased into the orbital path of the chucks 61 by a counter weight 170 affixed by a set screw 171 on an arm 172 held on the upper part of the channel 160 by a screw 173. In other words, the unitary assembly including the channel member 160 and member 161 carrying the shaft 166, collar 167 and inking disc 169 is rockable on the shaft 153. Therefore, the inking disc 169 is yieldingly urged against the rotating capsules held by the chucks 61 as the latter move orbitally along a path intersecting with the circle having the shaft 153 at the central end of a radius and a point on the periphery of the disc 169 at the outermost point of said radius.

The ink transferred by the disc 169 to the capsules is kept in a cup-shaped ink well 174 attached to the lower end of the channel 160. More particularly, the ink well 174 has threaded studs 175 mounted in its vertical side walls 176. The side walls 159 of the channel 160 are formed with aligned recesses 177 through which the studs 175 pass. Nuts 178 are threaded over the studs 175 to hold the ink well 174 on the channel member 160. The disc 169 is adapted to have its lower portion dipping into the ink in the well 174. The latter may be formed with an ink port 179 and may also have mounted on its floor a wiper strip 180 for removing excess ink from the disc 169 before the disc contacts the capsules. For this purpose, a bolt 181 may be adjustably threaded through a member 182 mounted between the walls 159 of the channel 160 and secured in position by screws 183. The bolt may be adjusted to bear against the wiper strip 180 to bias the latter properly against the inking disc 169. A set screw 184 may hold the bolt 181 in properly adjusted position.

A second inking device is provided which is rockable about a shaft 185 journalled in a sleeve 152a mounted in the support 150. The second inking device consists of parts corresponding functionally exactly with the parts of the first inking device. Hence the parts of the second inking device have been designated with numerals identical with those of the first inking device except for the addition to each numeral of the letter "a." It should be noted, in this connection that the two inking discs 169 and 169a are not aligned with each other. Therefore, the two discs deposit spaced parallel bands of ink on the capsules.

Driving means for the two inking devices are described as follows. It will be recalled that the capsule feeding and moving means are driven from the drive shaft 112 of the gear reducer 111 attached to the motor 110. The drive shaft 112 carries a sprocket 186 (as seen in Figure 2). A chain 187 is trained over sprocket 186 and also passes over tensioning sprockets 188 and 189 journalled on an angle iron 190 adjustably mounted on the bed 68. The tensioned chain 187 also is trained over a sprocket 191 affixed to a shaft 155 journalled in a sleeve 192 extending through the top of the support 150 (as seen in Figure 8). The shaft 155 is held against axial displacement by collars 193 affixed thereto on both sides of the sleeve 192 by set screws 193a. Another sprocket 194 is also affixed to the shaft 155 and has trained thereover a chain 195 which drives a sprocket 196 on the shaft 153. A pair of sprockets 197 and 198 attached, respectively, to the shafts 153 and 185, have a chain 199 trained thereover, to drive the shaft 185.

The two shafts 153 and 185 forming parts, respectively, of the upper and lower inking devices, being driven as disclosed, in turn actuate the inking discs 169 and 169a by means that are functionally identical as between the two inking devices. Hence, only the disc actuating means of the upper inking device will be described in detail. The actuating means in the lower inking device are designated in the drawing by the same numerals as the corresponding parts in the upper inking device, except for the addition to the numerals of the letter "a."

The previously described gear 158 on the shaft 153 drives another gear 200 affixed to a shaft 201 journalled in the walls 159 of the channel 160 and held in position by a collar 202 having a set screw 203. A sprocket 204 affixed to the end of shaft 201 drives a chain 205 engaging another sprocket 206 affixed to one end of the shaft 166 which carries the collar 167 and inking disc 169. The shaft 166 is held against axial displacement by a head 207 at one end thereof and by a collar 208 having a set screw 209.

The rate of rotation of the discs 169 and 169a is not critical. For depositing ink over lines or bands extending completely around the periphery of an individual capsule, it is merely necessary that the capsules are rotated fast enough so that each individual capsule performs at least one complete revolution while contacted by the inking discs. In certain cases, as when an aqueous coloring medium is applied to a gelatin capsule, the discs 169 and 169a should be rotated at a different peripheral rate than the capsules, to grind down or rub off the capsule surface whereby the coloring material is caused to adhere better to the capsules.

Figures 10, 11, 12:
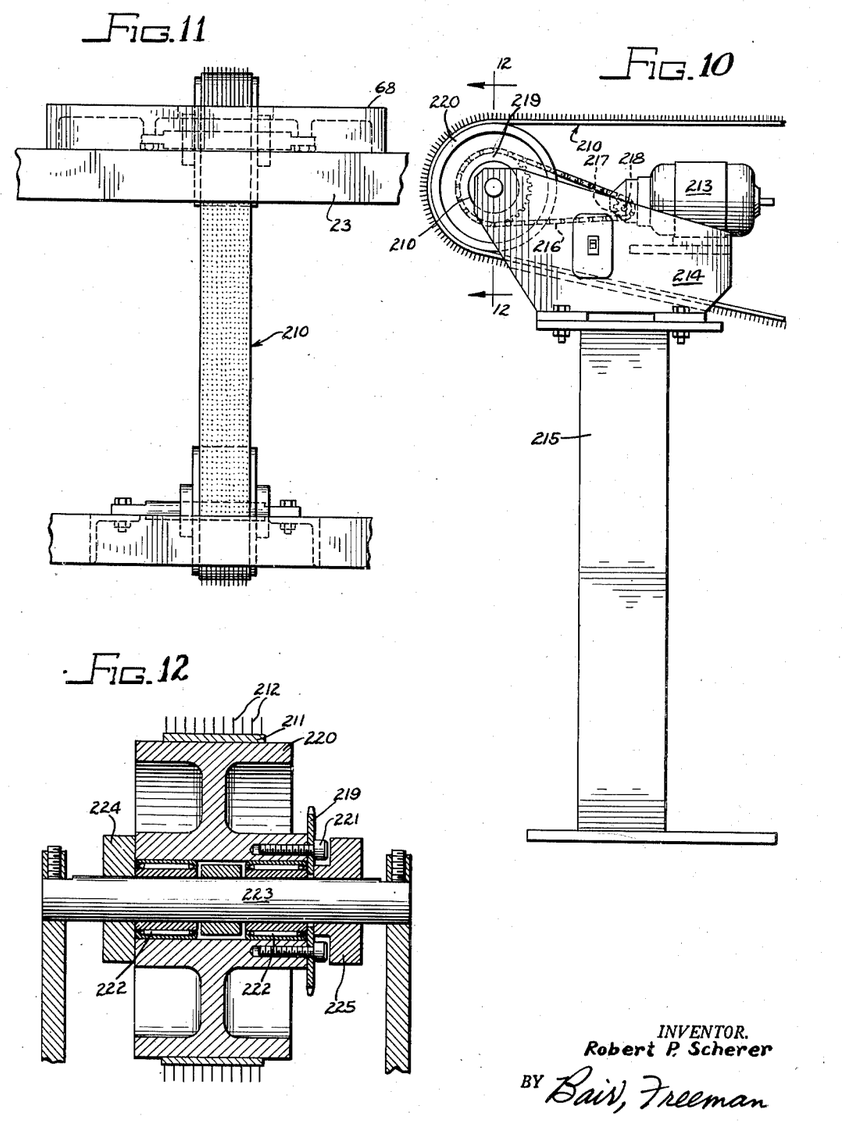
Figure 10 is an enlarged side elevational view of an end portion of said drying belt and said drive therefor omitted from Figure 1.
Figure 11 is an enlarged end elevational view of the end of said drying belt shown in Figure 1.
Figure 12 is an enlarged cross sectional view taken along the line 12—12 of Figure 10.

After the ink bands or lines have been deposited on the capsules, the chucks 61 release the capsules, being spread apart by the actions of the cams 99 and 99a. The capsules then drop onto a belt generally indicated by the reference numeral 210. As shown in Figures 5 and 12, the belt 210 includes a flexible band 211 having wire fingers 212 projecting from its surface. The fingers 212 are spaced apart by less than the smallest dimension of the capsules so that the capsules will be supported entirely by the fingers 212. Thus, each capsule is supported at what amounts to a few pin points, whereby smudging of the deposited still wet ink is prevented.

Figure 22:
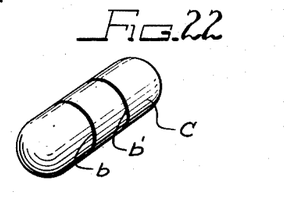
Figure 22 is an enlarged side elevational view of a capsule banded or striped by the apparatus of this invention.

An inked capsule is shown in Figure 22 where the capsule is designated C and the inked bands on the capsule C are indicated at $b$ and $b'$.

The belt 210 extends over a distance long enough to permit drying of the ink deposited on the capsules, while the capsules are carried by the belt. The driving and supporting means for the belt 210 are described as follows. As shown in Figure 10, a gear reducing drive motor 213 is mounted on a support 214 seated on a pedestal 215. A chain 216 is trained over a sprocket 217 mounted on the end of the drive shaft 218 of the gear reducer. The chain drives a sprocket 219 affixed to a wheel 220 as by means of bolts 221 (see Figure 12). The belt 210 passes over the wheel 220 which is positioned on roller bearings 222 mounted on a shaft 223 journaled in the support 214. Collars 224 and 225 on shaft 223 prevent axial displacement of the wheel 220. Thus, the belt 210 is driven by the wheel 220. As shown in Figure 5, the belt 210 also passes over a wheel 226 positioned on roller bearings 227 mounted on a shaft 228 supported from the underside of the bed 68 by bolts 229.

As disclosed, the end of the belt 210 passing over the wheel 226 is positioned to receive the capsules released by the chucks 61. The belt 210 then carries the capsules to its other end (which passes over the wheel 220), where the capsules are dropped as the belt passes over the wheel 220. If desired, means may be provided for accelerating the drying of the ink on the capsules while the capsules are carried by the belt 210, for instance, a battery of infra-red lamps, a fan or other means for directing a current of air against the capsules, or an oven through which the belt 210 may pass.

The function and operation of the above described apparatus is believed to be clear from the preceding description. Many details of structure and operation may be varied without departing from the principles of this invention. One such modification is described hereinbelow, with reference to Figures 13 and 14 and relates to a modified form of inking devices.

Figure 13:
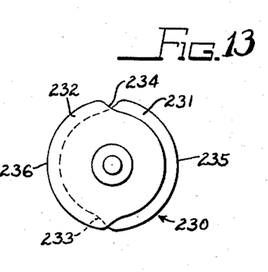
Figure 13 is an enlarged side elevational view of an inking disc of modified form adapted to be used in the inking mechanism of Figures 8 and 9.
Figure 14:
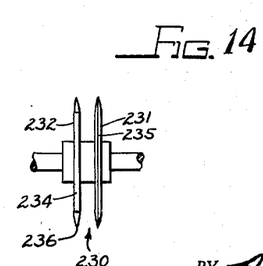
Figure 14 is an enlarged end elevational view of the inking disc of Figure 13.

The device of Figure 13 is particularly designed to deposit a plurality of continuous circumferential bands of ink on capsules having peripheries taht are not perfectly circular. Such capsules can be banded by the above described apparatus, for there the inking devices are individually rockable on the shafts 153 and 185, so that each inking disc 169 and 169a can follow the contours of each capsule. But if the discs 169 and 169a were mounted on a single shaft, then the two discs would be constrained to follow the same path when urged against a capsule having slightly irregular form. Now if the capsule should happen to be slightly depressed or slightly bulging at an area contacted by only one of the two discs, then one of the discs will not contact the capsule as the capsule presents this area to the inking discs in the course of its rotation. As a result, there will be a gap in the deposited ink band.

To avoid formation of such gaps, the inking device of Figure 13, there generally indicated by the reference numeral 230, is provided with two inking discs 231 and 232 each mutilated, as at 233 and 234 respectively, to leave capsule contacting surfaces 235 and 236 so positioned as not to contact the capsule simultaneously, at least over their whole extents. Thus, each contacting surface 235 and 236 can ride over the capsule surface independently of the other contacting surface, so that no gaps will be formed in the deposited ink bands. A suitable speed of capsule rotation must of course be effected in order to insure complete circumferential capsule contact with the two inking surfaces.

Many other modifications of the machine can be carried out without departing from the principles of this invention. It is therefore not my purpose to limit the patent granted on this invention otherwise than necessitated by the scope of the appended claims.

I claim:

1. A machine for applying a peripheral band of coloring material on capsules or the like, said machine comprising receptacle means for a mass of capsules, means comprising a conduit communicating with said receptacle means for receiving capsules therefrom for gravitational movement through said conduit with the leading capsule in said conduit extending at an angle to a vertical line therethrough, an upper movable gate member in said conduit capable of separating the leading capsule from the other capsules in said conduit, a lower movable gate member in said conduit capable of effecting discharge of said leading capsule from said conduit in a transverse direction, a sloping passageway disposed so as to receive falling capsules discharged from said conduit and extending generally transversely to the end of said conduit, a plurality of spaced members extending transversely of said passageway and movable to subdivide the gravitational capsule movement over said passageway into several steps, actuating means operative to move said gate members alternately into conduit closing positions and to move said spaced members to permit one step of capsule movement over said passageway at each movement of said upper gate member, means disposed at the end of said passageway for grasping each capsule at the ends thereof and for rotating the capsules when so grasped, and means for applying a band of coloring material on the rotating capsules.

2. A machine for applying a peripheral band of coloring material on capsules or the like, said machine comprising receptacle means for a mass of capsules, means comprising a conduit communicating with said receptacle means for receiving capsules therefrom for gravitational movement through said conduit with the leading capsule in said conduit extending at an angle to a vertical line therethrough, an upper movable gate member in said conduit capable of separating the leading capsule from the other capsules in said conduit, a lower movable gate member in said conduit capable of effecting discharge of said leading capsule from said conduit in a transverse direction, a sloping passageway disposed so as to receive falling capsules discharged from said conduit and extending generally transversely to the end of said conduit, a plurality of spaced members extending transversely of said passageway and movable to subdivide the gravitational capsule movement over said passageway into several steps, a pair of spaced wheels rotatably disposed with the end of said passageway projecting therebetween, a plurality of pairs of opposed grasping members rotatably carried by said wheels to be successively aligned with a capsule resting on the end of said passageway as said wheels are rotated, means for rotating said wheels and said grasping members, actuating means operative to move said gate members alternately into conduit closing positions, to move said spaced members to permit one step of capsule movement over said passageway at each movement of said upper gate member and to effect capsule grasping movement of each pair of grasping members as the latter are aligned with a capsule on the end of said passageway on rotation of said wheels, and means for applying a band of coloring material on the rotating capsules held by said grasping members.

3. A machine for applying a peripheral band of coloring material on capsules or the like, said machine comprising receptacle means for a mass of capsules, means comprising a conduit communicating with said receptacle means for receiving capsules therefrom for gravitational movement through said conduit with the leading capsule in said conduit extending at an angle to a vertical line therethrough, an upper movable gate member in said conduit capable of separating the leading capsule from the other capsules in said conduit, a lower movable gate member in said conduit capable of effecting discharge of said leading capsule from said conduit in a transverse direction, a sloping passageway disposed so as to receive falling capsules discharged from said conduit and extending generally transversely to the end of said conduit, a plurality of spaced members extending transversely of said passageway and movable to subdivide the gravitational capsule movement over said passageway into several steps, a pair of spaced wheels rotatably disposed with the end of said passageway projecting therebetween, a plurality of pairs of opposed chuck members rotatably and reciprocably carried by said wheels to be successively aligned with a capsule resting on the end of said passageway as said wheels are rotated, means for rotating said wheels and said chucks, actuating means operative to move said gate members alternately into conduit closing positions and to move said spaced members to permit one step of capsule movement over said passageway at each movement of said upper gate member, cam means carried by one of said wheels operative to move said actuating means to effect each last step in said capsule movement over said passageway as said wheels carry one of said pairs of chucks into alignment with a capsule at the end of said passageway, chuck reciprocating means operative to cause chuck engagement with said capsule at the end of said passageway for grasping said capsule and to disengage said capsule after said capsule has been carried by said chucks over a predetermined distance, and means for applying a band of coloring material on each capsule when carried and rotated by said chucks.

4. A machine for applying a peripheral band of coloring material on capsules or the like, said machine comprising receptacle means for a mass of capsules, means comprising a conduit communicating with the bottom of said receptacle means for receiving capsules therefrom for gravitational movement through said conduit in single file with the leading capsule in said conduit extending at an angle to a vertical line therethrough, an upper movable gate member in said conduit capable of separating the leading capsule from the other capsules in said conduit, a lower movable gate member in said conduit capable of effecting discharge of said leading capsule from said conduit in a transverse direction, a sloping passageway formed with spaced transverse slots and with a terminal upward projection for arresting capsule movement, said passageway having its upper end disposed to receive falling capsules discharged from said conduit and extending generally transversely to the end of said conduit, a plurality of tongues alternately reciprocable in the slots of said passageway to subdivide the gravitational movement of capsules over said passageway into several steps, a pair of spaced wheels rotatably disposed with the end of said passageway projecting therebetween, a plurality of pairs of opposed chuck members rotatably and reciprocably carried by said wheels to be successively aligned with capsules resting against said upward projection at the end of said passageway, means for rotating said wheels and said chucks, actuating means operative to move said gate members alternately into conduit closing positions and to move said tongues alternately in opposite directions to permit one step of capsule movement over said passageway at each movement of said upper gate member, cam means carried by one of said wheels operative to move said actuating means to effect each step in said capsule movement over said passageway as said wheels carry one of said pairs of chucks into alignment with a capsule which has come to rest against said upward projection at the end of said passageway, chuck reciprocating means operative to cause chuck engagement with said capsule resting at the end of said passageway for grasping said capsule and to disengage said capsule after said capsule has been carried by said chucks for a predetermined distance over an orbital path, a disc having an edge capable of carrying a liquid coloring material, means for rotatably supporting said disc in yielding edge contact with each capsule carried by said chucks, and means for rotating said disc.

5. A conveying machine for capsules or the like adapted for use in presenting said capsules to a device for applying a colored stripe thereto, said machine comprising receptacle means for a mass of capsules, means comprising a conduit communicating with said receptacle means and operative to align said capsules end-to-end, means for discharging said capsules one by one from said conduit in a direction transverse to their path thru the conduit, means for advancing individual capsules step by step along a path disposed transversely of the end of said conduit to receive capsules discharged therefrom, means disposed at the end of said capsule advancing means for grasping each capsule at the ends thereof and for rotating the capsules when so grasped, a pair of opposed discs, and complementary capsule end engaging elements carried thereby, said elements being movable transversely of the planes of said discs to engage and release the capsules.

6. A conveying machine for capsules and the like adapted for use in presenting said capsules to a device for applying a colored stripe thereto, said machine comprising a receptacle means for a mass of contacting capsules oriented at random, feeding means for withdrawing capsules from said mass, means for orienting the withdrawn capsules end-to-end and in a predetermined direction, means for advancing the capsules in a direction generally transverse with respect to their end-to-end orientation, said means for advancing being operated step-by-step and being operable to deposit the oriented capsules successively at a predetermined station and arrest movement of the thus deposited capsules, a plurality of means each capable of individually grasping a single capsule deposited at said station, means for moving said plurality of grasping means along a circular path, and means for rotating each of said capsule grasping means as they are moved along said circular path, said article grasping means being operative to release each capsule at one point in said circular path and grasp another capsule at said station.

ROBERT PAULI SCHERER.

REFERENCES CITED

The following references are of record in the file of this patent:

UNITED STATES PATENTS

| Number | Name | Date |
| --- | --- | --- |
| 2,079,615 | Holt et al. | May 11, 1937 |
| 2,085,389 | Purington | June 29, 1937 |
| 2,169,772 | Schweitzer | Aug. 15, 1939 |
| 2,192,833 | Johnson | Mar. 5, 1940 |
| 2,215,981 | Schutz | Sept. 24, 1940 |
| 2,270,177 | Vawryk | Jan. 13, 1942 |
| 2,326,850 | Gladfelter et al. | Aug. 17, 1943 |
| 2,330,124 | James | Sept. 21, 1943 |